(12) United States Patent
McGaharn

(10) Patent No.: US 11,361,647 B2
(45) Date of Patent: Jun. 14, 2022

(54) SYSTEM AND METHOD OF WIRELESSLY TRACKING A WALKING ASSISTANCE TOOL

(71) Applicant: Michael A. McGaharn, Pasadena, CA (US)

(72) Inventor: Michael A. McGaharn, Pasadena, CA (US)

(*) Notice: Subject to any disclaimer, the term of this patent is extended or adjusted under 35 U.S.C. 154(b) by 32 days.

(21) Appl. No.: 17/063,562

(22) Filed: Oct. 5, 2020

(65) Prior Publication Data
US 2021/0104141 A1 Apr. 8, 2021

Related U.S. Application Data

(60) Provisional application No. 62/911,137, filed on Oct. 4, 2019.

(51) Int. Cl.
*G08B 21/02* (2006.01)
*H04W 4/02* (2018.01)
*H04W 4/029* (2018.01)
*H04W 4/021* (2018.01)

(52) U.S. Cl.
CPC ....... *G08B 21/0225* (2013.01); *G08B 21/028* (2013.01); *G08B 21/0288* (2013.01); *H04W 4/021* (2013.01); *H04W 4/023* (2013.01); *H04W 4/029* (2018.02)

(58) Field of Classification Search
CPC .............. G08B 21/0225; G08B 21/028; G08B 21/0288; G08B 21/0261; G08B 21/0266; G08B 21/24; H04W 4/021; H04W 4/023; H04W 4/029
See application file for complete search history.

(56) References Cited

U.S. PATENT DOCUMENTS

| | | | | |
|---|---|---|---|---|
| 10,470,059 B1* | 11/2019 | Annambhotla | ....... | H04W 4/021 |
| 10,617,182 B1* | 4/2020 | Perkins | ..... | A45B 3/00 |
| 2010/0289644 A1* | 11/2010 | Slavin | ........... | G08B 13/2402 |
| | | | | 340/568.1 |
| 2014/0285335 A1* | 9/2014 | Haas | .......... | G08B 21/24 |
| | | | | 340/500 |
| 2016/0260313 A1* | 9/2016 | Thorpe | ............ | G08B 21/24 |
| 2017/0154514 A1* | 6/2017 | Condon | ............. | G08B 21/182 |
| 2018/0103342 A1* | 4/2018 | Taylor | ............ | H04B 1/385 |
| 2019/0142120 A1* | 5/2019 | AlGhazi | ........... | A45B 3/00 |
| | | | | 135/66 |
| 2019/0197864 A1* | 6/2019 | Hui | ................. | G08B 21/0277 |
| 2019/0231619 A1* | 8/2019 | Moore | ................. | B60L 15/20 |
| 2019/0328282 A1* | 10/2019 | Alghazi | ............... | A61B 5/112 |

* cited by examiner

*Primary Examiner* — Ryan W Sherwin

(57) ABSTRACT

A system and method of wirelessly tracking a walking assistance tool notifies a user from escaping past a safe perimeter and monitors the location of the walking assistance tool with respect to the user. The system includes a wearable device, a locator tag, and a walking assistance tool. The method begins by tracking a current device location with the wearable device, and a current tag location is tracked with the locator tag. The current tag location is relayed from the location tag to the wearable device. A distance difference is calculated between the current device location and the current tag location with the wearable device. A separation alert is outputted with the wearable device, if the distance is greater than or equal to a proximal distance threshold. A desertion alert is outputted with the wearable device, if the current device location is outside of a geofenced area.

18 Claims, 20 Drawing Sheets

SYSTEM AND METHOD OF WIRELESSLY TRACKING A WALKING ASSISTANCE TOOL

The current application claims a priority to the U.S. provisional patent application Ser. No. 62/911,137 filed on Oct. 4, 2019. The current application is filed on Oct. 5, 2020 while Oct. 4, 2020 was on a weekend.

FIELD OF THE INVENTION

The present invention generally relates to walking instruments. More specifically, the present invention wireless tracking a walking assistance tool.

BACKGROUND OF THE INVENTION

Elderly individuals and injured individuals heavily rely on walking instruments to safely move from one location to another location. Without the walking instrument the risk of falling increases significantly as well as fatal accidents. However, due to the current mental status of elderly individuals and the physical and mental obstacles being face by injured individuals, it is easy to accidentally forget the walking instrument inside a home, a vehicle, along a ledge, and so on. In addition to the increased risk of fatal accidents without the walking instrument, an elderly individual and an injured individual may now have to purchase another walking instrument.

It is therefore an objective of the present invention to notify a user if a walking instrument associated with the user is out of a safe range with the user. The present invention is notified with a wearable device, preferably a piece of jewelry. The present invention also monitors the location of not only the walking instrument but the user as well with the wearable device. The walking instrument may be integrated with a locator system so that the locator system is permanently fixed with the walking instrument. The present invention also serves as a universal accessory for walking instruments as the locator system may be attached onto a variety of walking instruments with an elastic band.

DETAIL DESCRIPTIONS OF THE INVENTION

All illustrations of the drawings are for the purpose of describing selected versions of the present invention and are not intended to limit the scope of the present invention.

Figure 1:
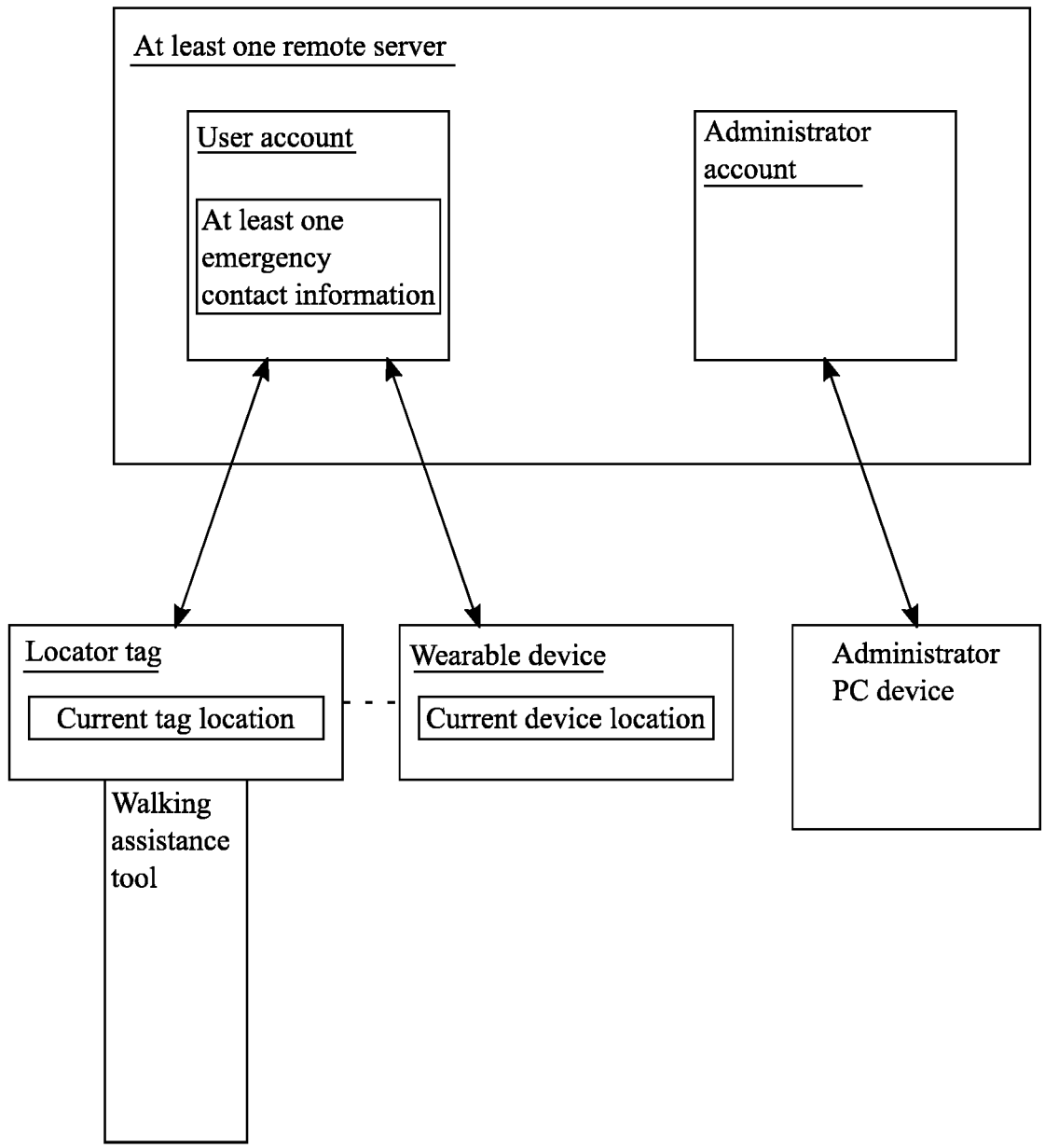
FIG. 1 is a block diagram illustrating the system for the present invention.

The present invention is a system and method of tracking a walking assistance tool. The present invention prevents a user from being positioned in an unsafe range from a corresponding walking assistance tool and a safe area. The user is preferably an elderly person but may also be any individual with a disability in need of additional monitoring and care. The present invention immediately notifies caretakers and family members once an emergency or situation has been detected, thereby reducing the chances of any serious injuries and fatal incidents. Thus, the physical system used to implement the method for the present invention includes a wearable device, a locator tag, and a walking assistance tool (Step A), seen in FIG. 1. The wearable device may be, but is not limited to, a necklace, a bracelet, and a watch. The wearable device monitors the location of the user in real time. The wearable device may also be attached onto the attire of the user with a pin or a clip. The pin is preferably attached to a top, such as a blouse or shirt, so that the wearable device is easily accessible by the user. Similarly, the clip is preferably attached to a belt so that the user may easily access the wearable ornament. The locator tag monitors the location of the walking assistance tool and is either integrated into or attached onto the walking assistance tool. The walking assistance tool is preferably a cane, but may also be a walker, a wheelchair, and so on. The current location of the user with the wearable device further ensures the safety of the user as the wearable device stores a proximal distance threshold and a geofenced area. The proximal distance is the distance between the wearable device and the locator tag, and the geofenced area is the designated area surrounding a home, a housing complex, an assisted living facility, a rehabilitation center, and so on.

Figure 2:
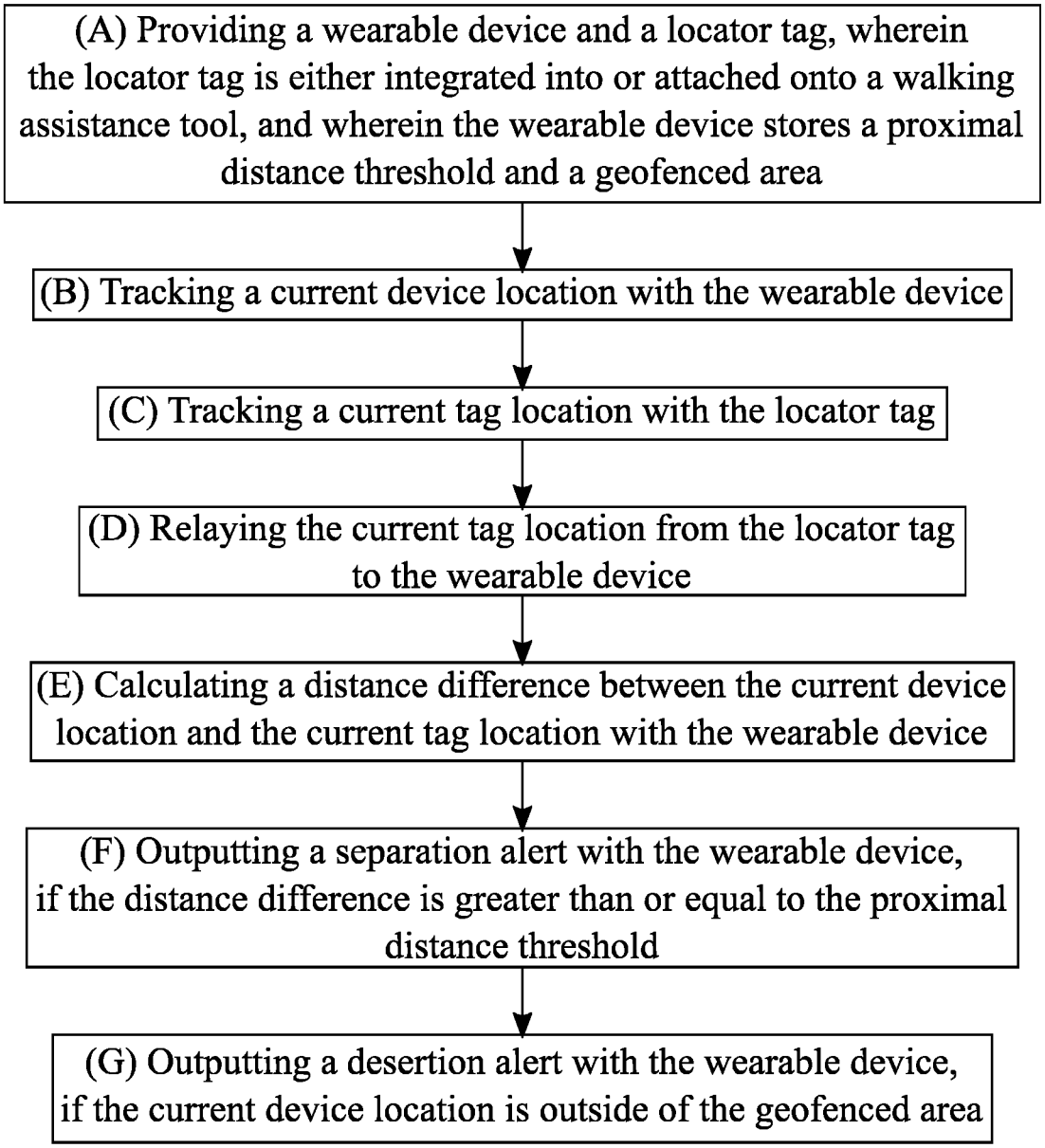
FIG. 2 is a flowchart illustrating the overall process for the method of the present invention.

The overall process for the method of the present invention includes the following steps that are implemented with the wearable device, the locator tag, and the walking assistance tool. Shown in FIG. 2, the overall process begins by tracking a current device location with the wearable device (Step B) in order to determine the location of the user. The current device location is the real-time location of the wearable device. A current tag location is tracked with the locator tag (Step C) in order to determine the location of the walking assistance tool. The current tag location is the real-time location of the locator tag. The walking assistance tool remains within a reachable and safe range of the user as the current tag location is relayed from the locator tag to the wearable device (Step D). A distance difference between the current device location and the current tag location is calculated with the wearable device (Step E) so that a safe distance is maintained between the user and the walking assistance tool at all times. In the event that the user has left behind the walking assistance tool on accident, a separation alert is outputted with the wearable device, if the distance is greater than or equal to the proximal distance threshold (Step F). The separation alert notifies the user of the misplaced or forgotten walking assistance tool within the geofenced area. The separation alert may be an audible or visual alert that grabs the immediate attention of the user. In the event that the user has walked past a designated safe area, a desertion alert is outputted with the wearable device, if the current device location is outside of the geofenced area (Step G). The desertion alert notifies the user of being positioned in an unsafe area. Similarly, the desertion alert may be an audible or visual alert that grabs the immediate attention of the user. The separation alert and the desertion alert are preferably configured to notably distinguish from one another.

Figure 3:
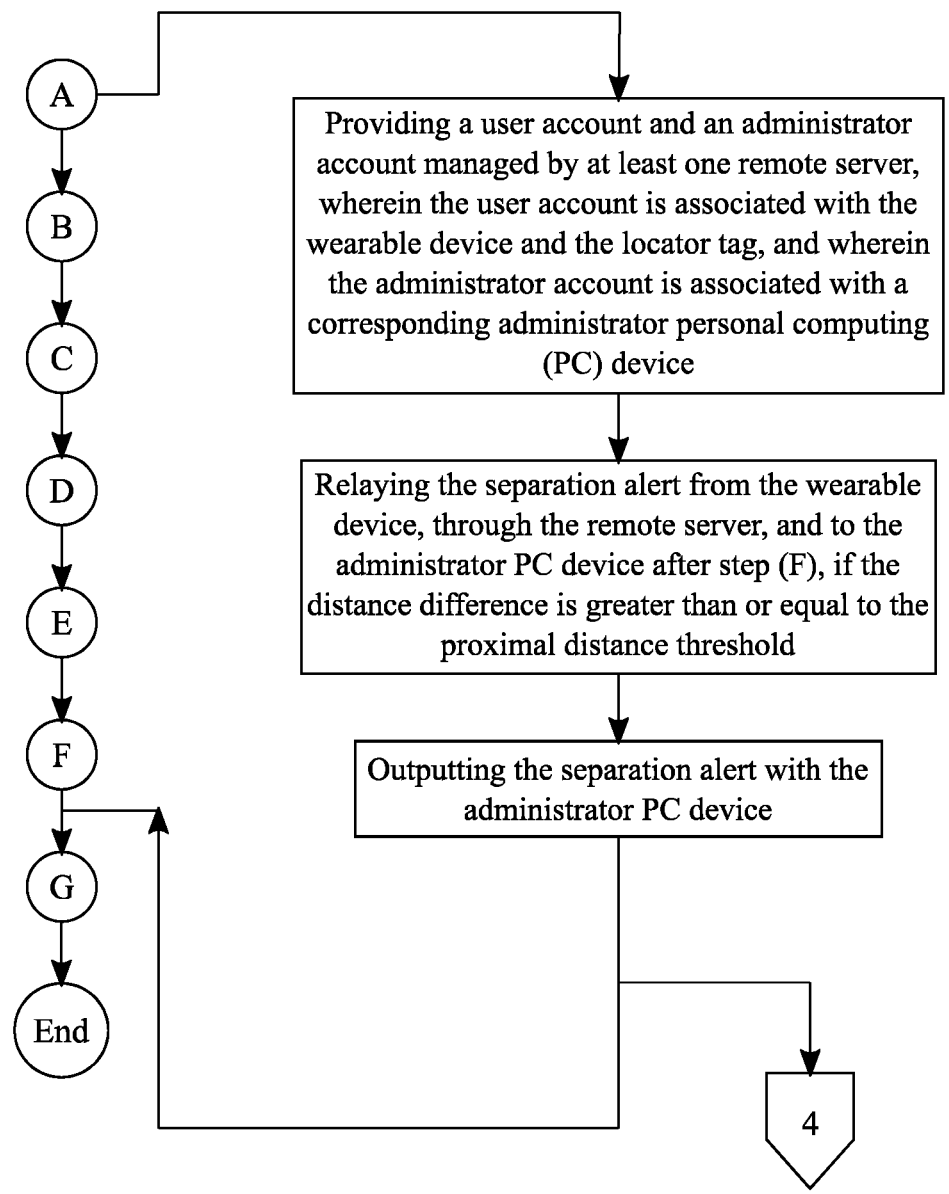
FIG. 3 is a flowchart illustrating the subprocess for outputting a separation alert with an administrator PC device.
Figure 4:
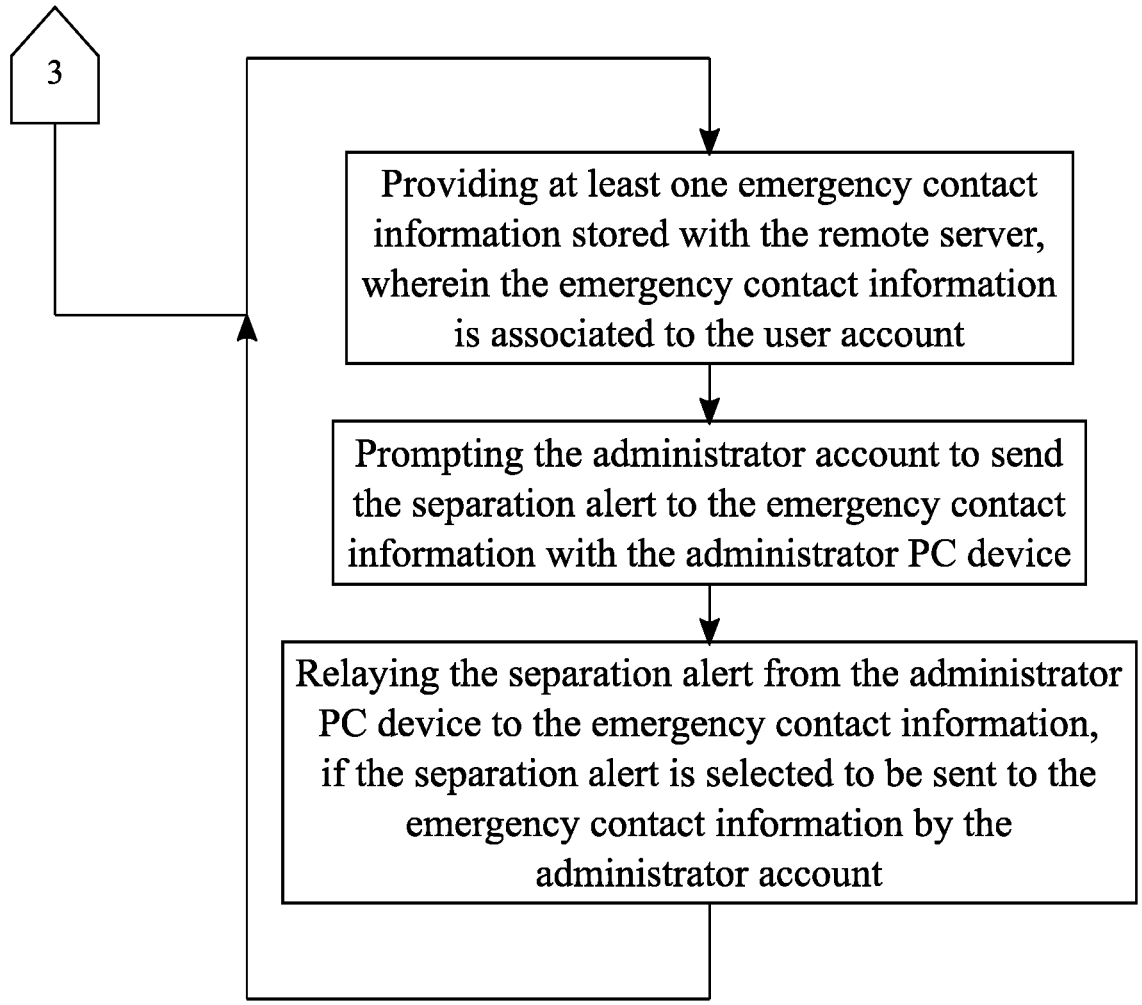
FIG. 4 is a flowchart illustrating the subprocess for relaying the separation alert from the administrator PC device to an emergency contact information associated to a user account.

The user, an elderly person or disabled individual, is distinguishable from an administrator, a caretaker or family member, as a user account and an administrator account are provided and managed by at least one remote server, seen in FIG. 3. The remote server is used as a hub to manage information being exchanged between different uses that are interacting with the present invention. Moreover, if the geofenced area includes multiple users, such as a retirement home or a home with more than one elderly persons, a plurality of user accounts may be monitored by an administrator account. Furthermore, if a user is associated with multiple administrators such as a nurse, a doctor, a security guard, a live-in family member, and so on, a plurality of administrator accounts may monitor each user account. The user account is associated with the wearable device and the locator tag, thereby identifying an elderly person or a disabled individual. The administrator account is associated with a corresponding administrator personal computing (PC) device, thereby identifying a caretaker or a family member. The corresponding administrator PC device can be, but is not limited to, a smart phone, a tablet PC, a laptop, a desktop, and a smart watch. It is understood that the corresponding administrator PC device may be operated with a variety of languages. The separation alert is relayed from the wearable device, through the remote server, and to the administrator PC device after Step F, if the distance difference is greater than or equal to the proximal distance threshold. This allows the administrator to be made aware that the user has forgotten or is out of reach of the walking assistance tool. The administrator is notified as the separation alert is outputted with the administrator PC device, preferably as a message. The message may be accompanied with an audible alert as well. If the geofenced area corresponds to a commercial complex or assisted facility such as an retirement home or a hospital, and family members or guardians are not constantly present, at least one emergency contact information is provided and stored with the remote server, seen in FIG. 4. The at least one emergency contact information is associated with a family member or guardian that is not constantly present with the user on the premises that would like to be notified in the event of an accident or emergency. The administrator account is prompted to send the separation alert to the emergency contact information, if the separation alert is selected to be sent to the emergency contact information by the administrator account, thereby notifying the family member or guardian associated with the at least one emergency contact of the incident.

Figure 5:
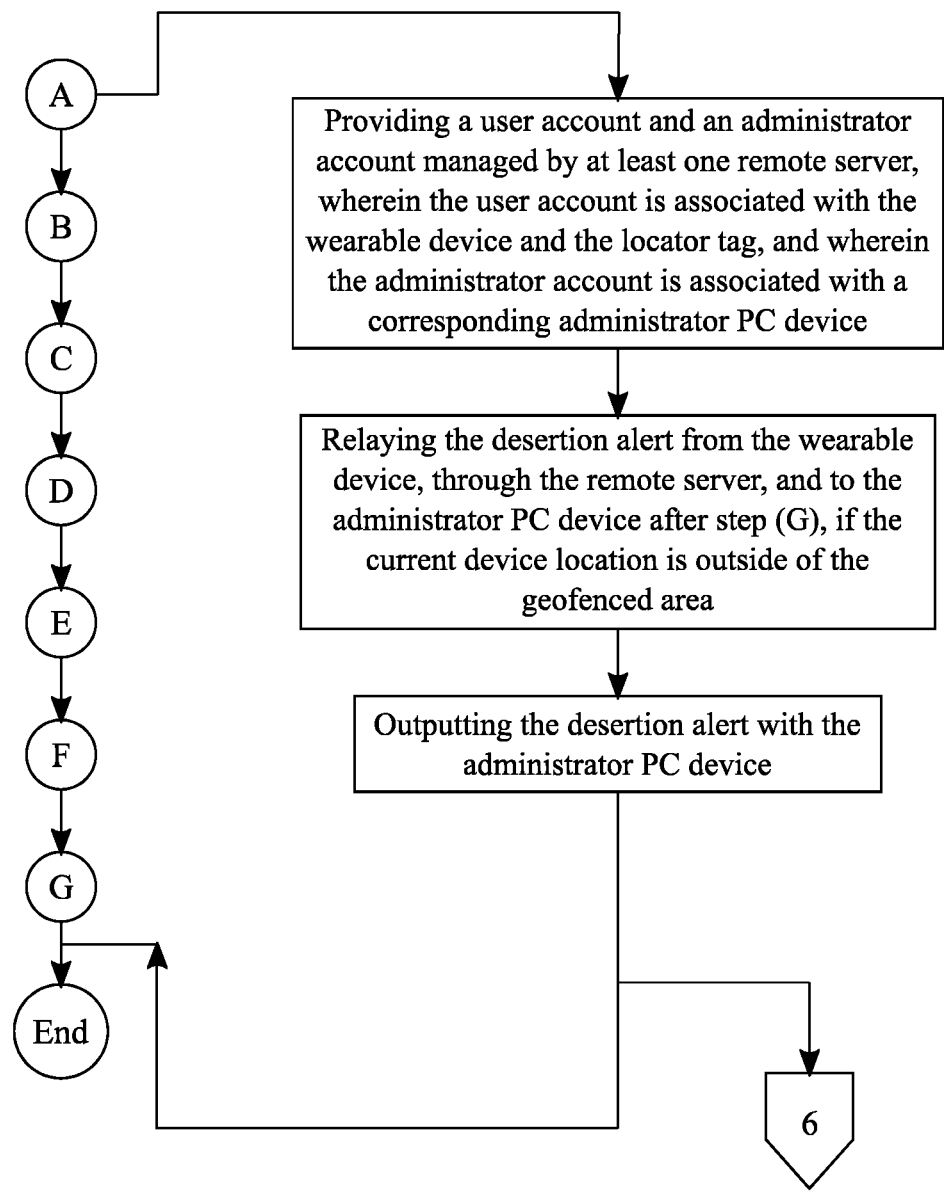
FIG. 5 is a flowchart illustrating the subprocess for outputting a desertion alert with the administrator PC device.
Figure 6:
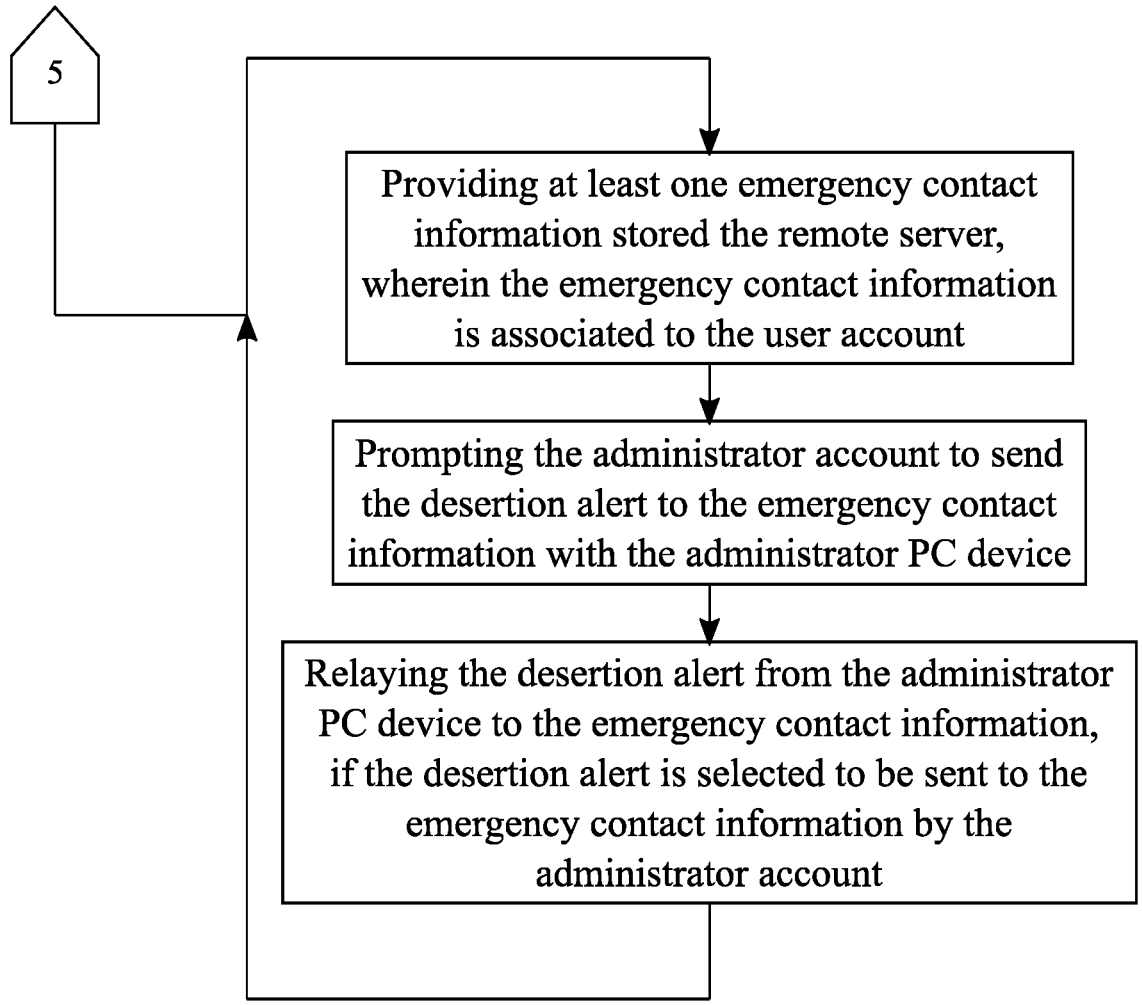
FIG. 6 is a flowchart illustrating the subprocess for relaying the desertion alert from the administrator PC device to the emergency contact information associated to the user account.
Figure 7:
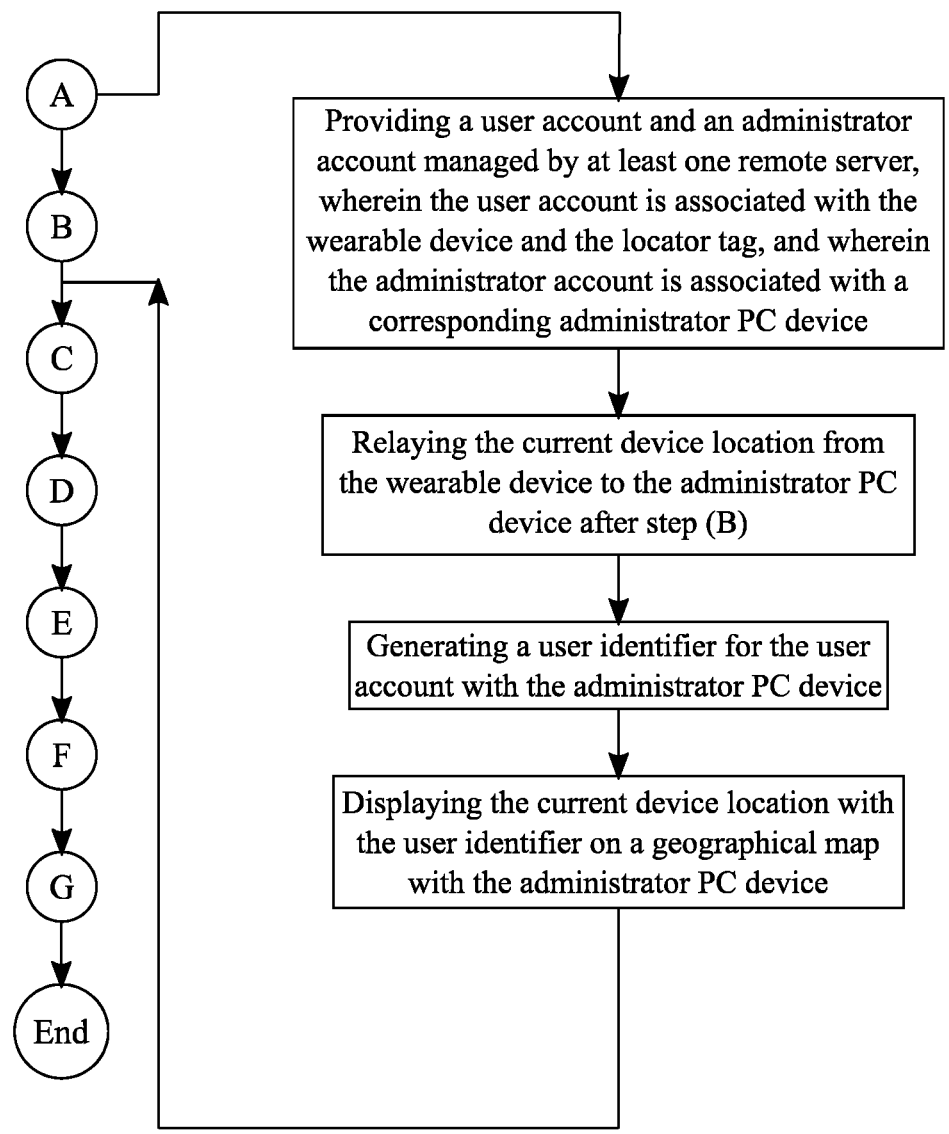
FIG. 7 is a flowchart illustrating the subprocess for displaying a current device location with a user identifier on a geographical map with the administrator PC device.

In order for the administrator to be made aware that user is not safely positioned within geofenced area, the desertion alert is relayed from the wearable device, through the remote server, and to the administrator PC device after Step G, if the current device location is outside of the geofenced area, seen in FIG. 5. This allows the administrator to be made aware that the user had either exited the home, the retirement home, or the assisted living facility. The administrator is notified as the desertion alert is outputted with the administrator PC device, also preferably as a message. The message may be accompanied with an audible alert as well. Similarly, if the geofenced area corresponds to a commercial complex or assisted facility such as an retirement home or a hospital, and family members or guardians are not constantly present, the administrator account is prompted to send the desertion alert to the emergency contact information with the administrator PC device, shown in FIG. 6. The desertion alert is relayed from the administrator PC device to the emergency contact information, if the desertion alert is selected to be sent to the emergency contact information by the administrator account, thereby notifying the family member or guardian associated with the at least one emergency contact of the incident In order to view the location of the wearable device, and consequently the user, in real time, the current device location is relayed from the wearable device to the administrator PC device after Step B, as seen in FIG. 7. A user identifier is generated for the user account with the administrator PC device, thereby identifying and distinguishing the user from the administrator and possibly other users being monitored by the administrator. The current device location with the user identifier is displayed on a geographical map with the administrator PC device. This allows the administrator to readily view the current position of the user.

Figure 8:
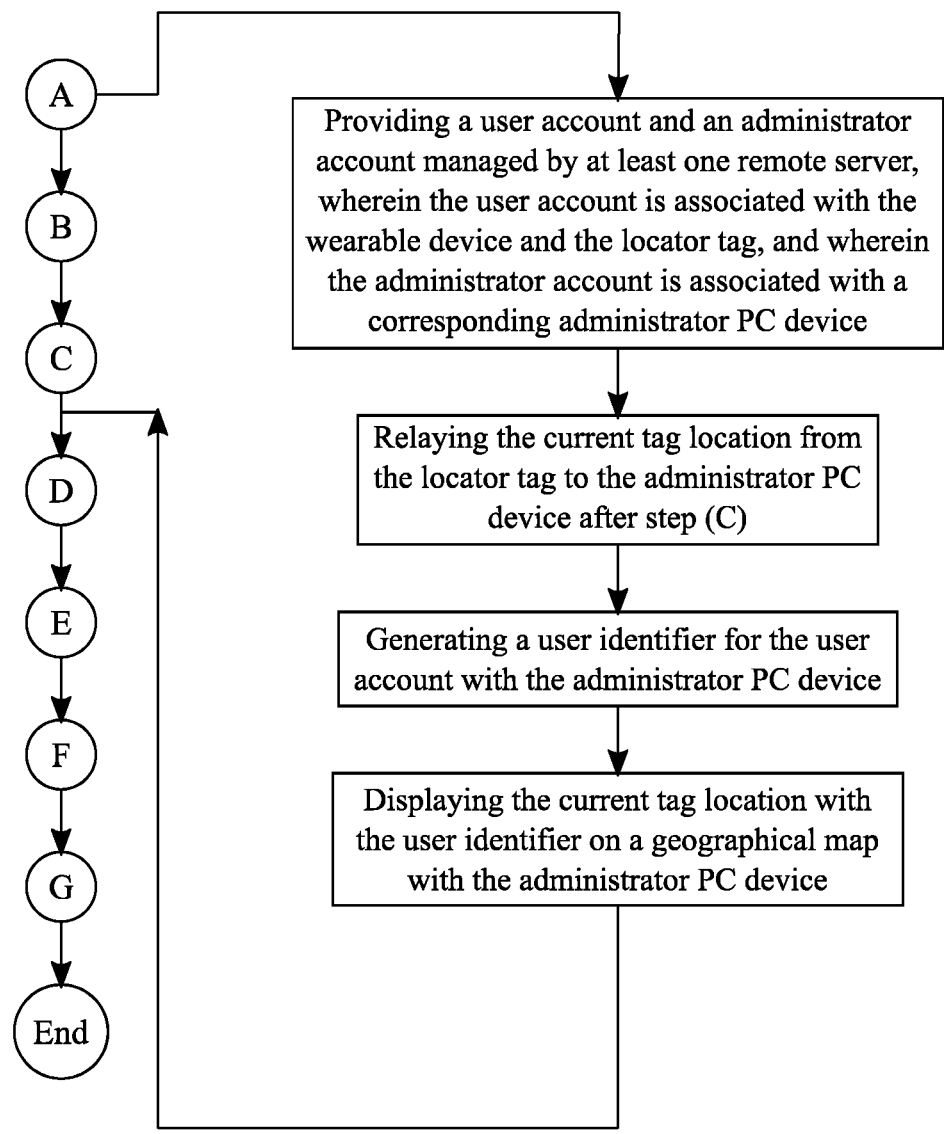
FIG. 8 is a flowchart illustrating the subprocess for displaying a current tag location with the user identifier on the geographical map with the administrator PC device.

Likewise, in order to view the location of the locator tag, and consequently the walking assistance tool, the current tag location is relayed from the locator tag to the administrator PC device after Step C, seen in FIG. 8. A user identifier is generated for the user account with the administrator PC device, thereby identifying and distinguishing the user associated with the walking assistance tool. The current tag location with the user identifier is displayed on a geographical map with the administrator PC device, allowing the administrator to readily view the current position of the walking assistance tool.

Figure 9:
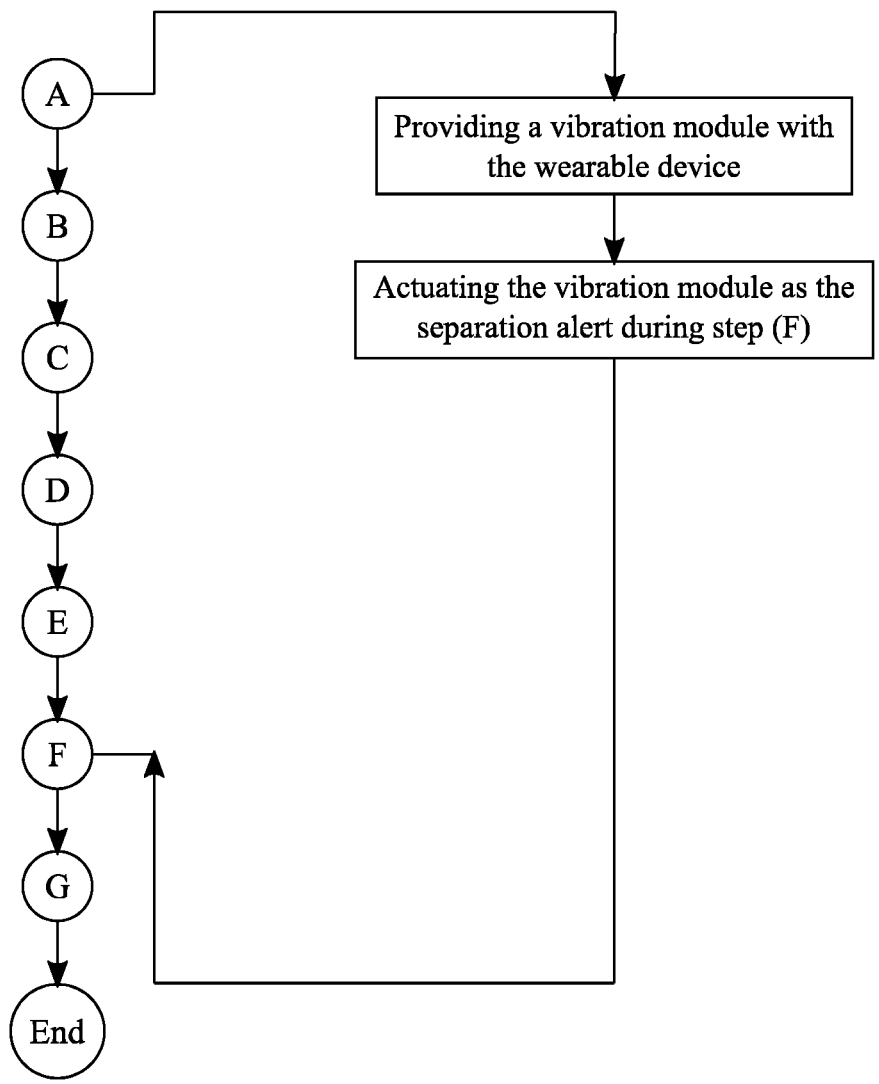
FIG. 9 is a flowchart illustrating the subprocess for actuating a vibration module as the separation alert.
Figure 10:
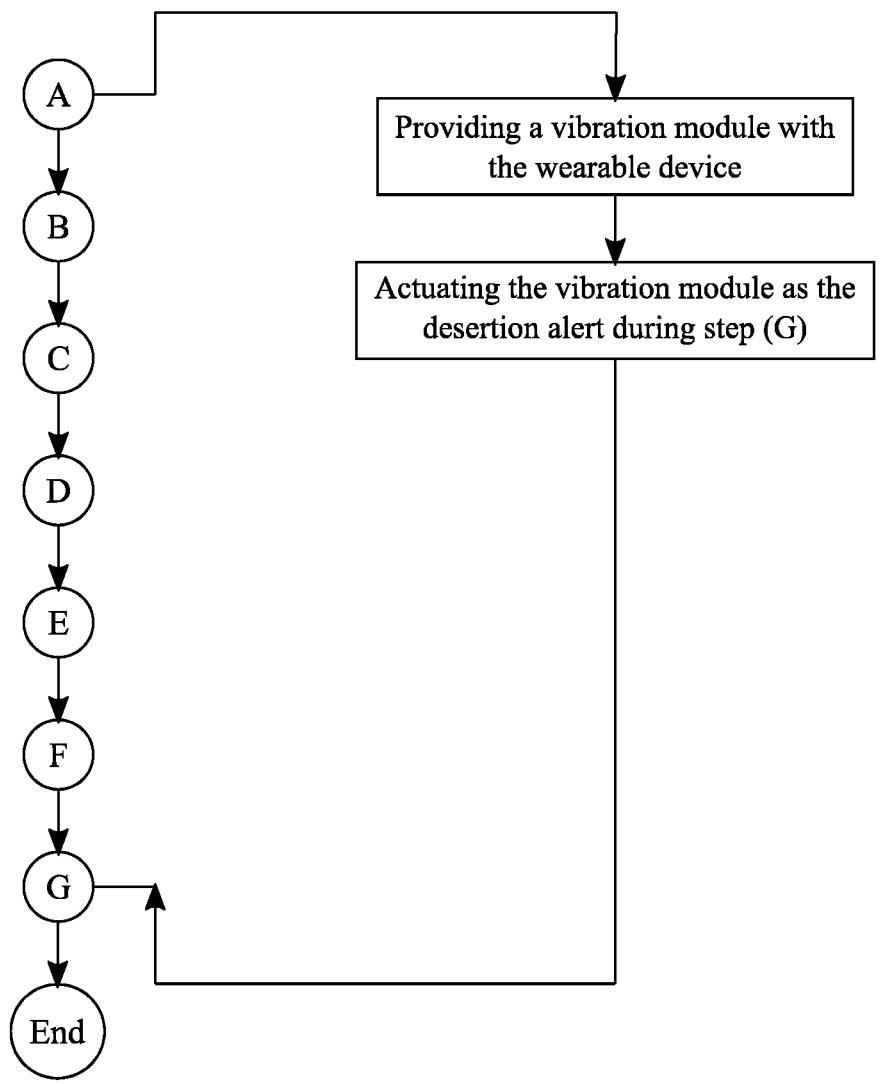
FIG. 10 is a flowchart illustrating the subprocess for actuating a vibration module as the separation alert.

The user is notified if the walking assistance tool has been left behind as a vibration module is provided with the wearable device. The vibration module vibrates the wearable device in the event the user is hard of hearing or visually impaired. Moreover, the vibration module amplifies the desertion alert and compliments the audio and visual alerts. As seen in FIG. 9, the vibration module is actuated as part of the separation alert during Step F to physically notify the user that the walking assistance tool has been left behind or is out of reach. Likewise, the user is notified if not positioned within a designated and safe perimeter as the vibration module is actuated as part of the desertion alert during Step G, seen in FIG. 10.

Figure 11:
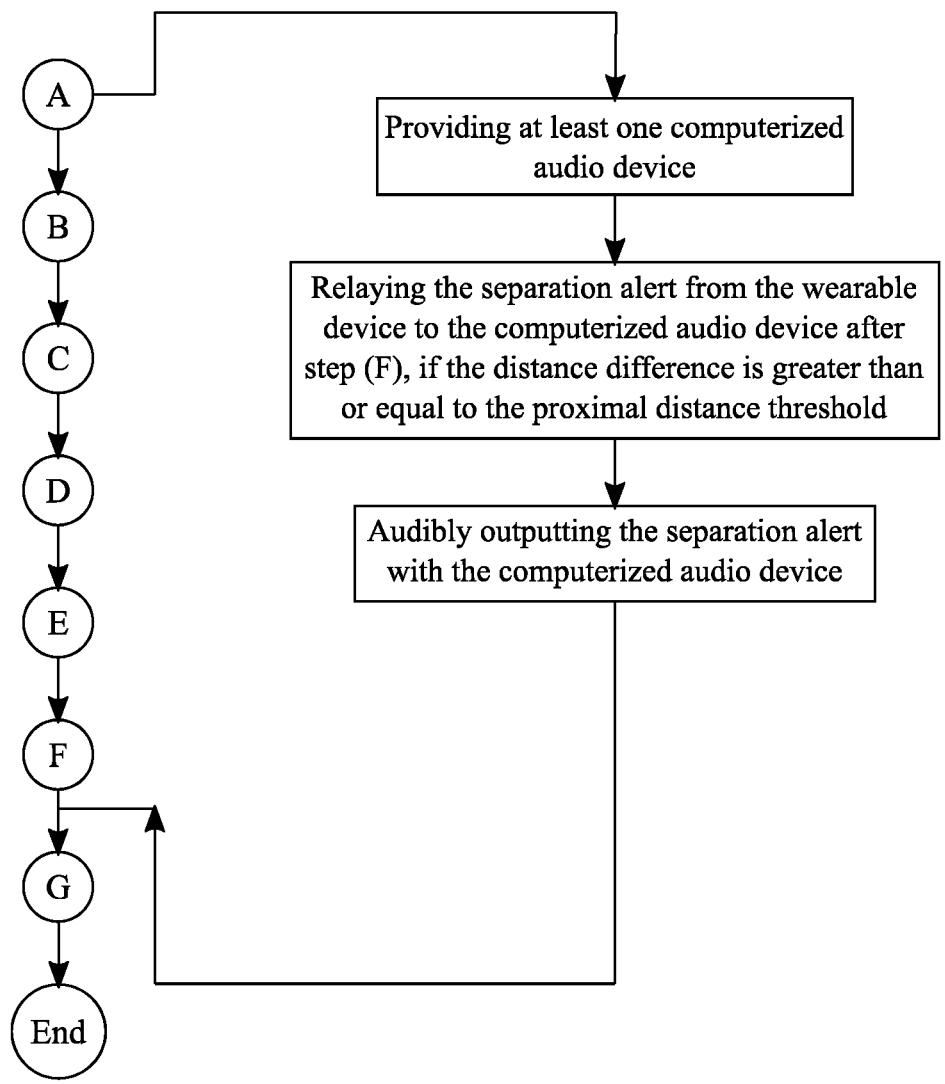
FIG. 11 is a flowchart illustrating the subprocess for audibly outputting the separation alert with a computerized audio device.
Figure 12:
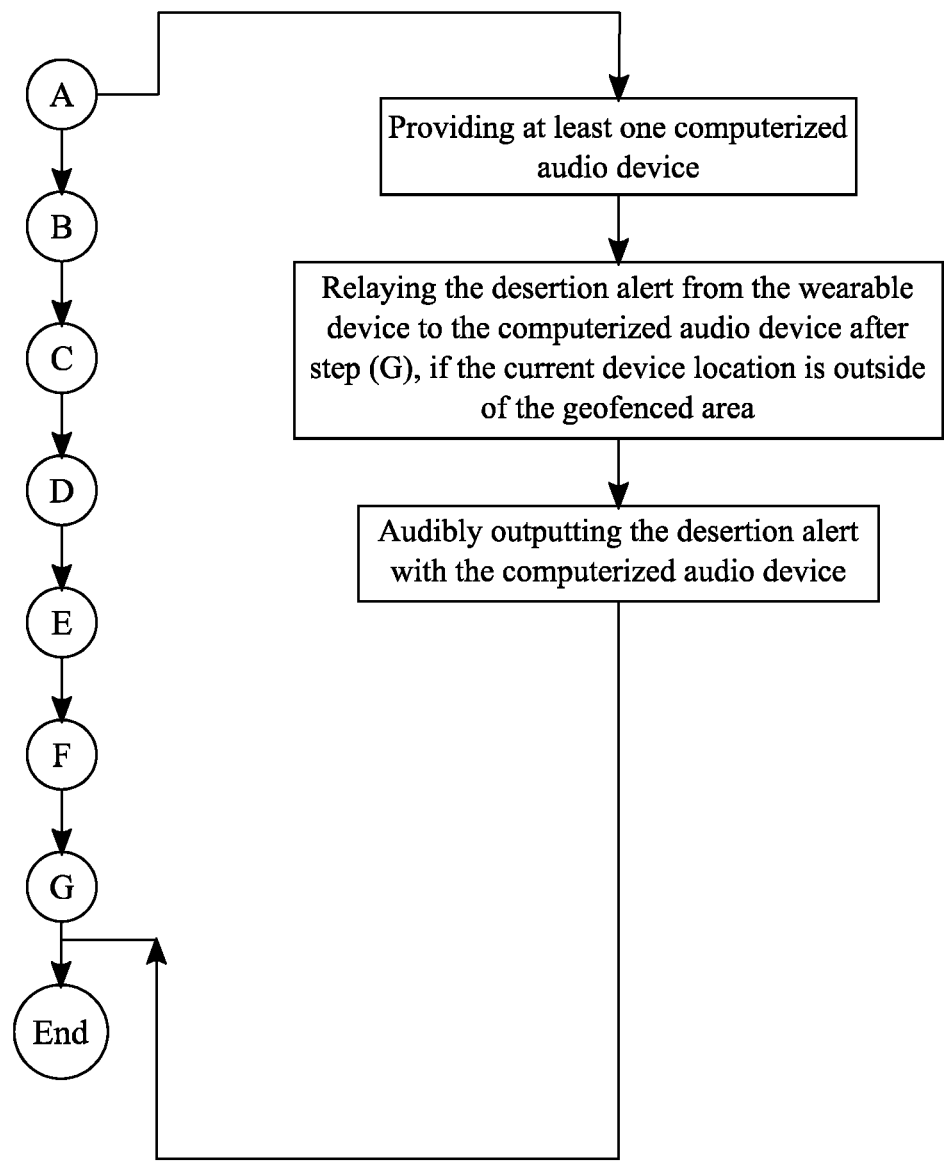
FIG. 12 is a flowchart illustrating the subprocess for audibly outputting the desertion alert with the computerized audio device.

As the user is typically elderly or possible physically challenged, additional device may aid to alert the user. At least one computerized audio device is provided in order to effectively notify the user, seen in FIG. 11. The at least one computerized audio device is preferably a hearing aid device. Alternatively, the at least one computerized audio device is a personal assistance device such as Amazon's Alexa, Google Home, Apple's iHome, and so on. The separation alert is relayed from the wearable device to the computerized audio device after Step F, if the distance difference is greater than or equal to the proximal distance threshold, thereby interfacing with the computerized audio device. If the computerized audio device is a hearing aid, then the separation alert is audibly outputted with the computerized audio device as a sound that is prepared to enter the user's ear. If the computerized audio device is a personal assistance device, the personal assistance device, then the separation alert is audibly outputted with the computerized audio device as an ambient sound that is casually heard by the user. Similarly, the desertion alert is relayed from the wearable device to the computerized audio device after Step G, if the current device location is outside of the geofenced area, also interfacing with the computerized audio device, as seen in FIG. 12. The desertion alert is audibly outputted with the computerized audio device so that an alarm may be directed into the ear of the user or the computerized audio device may output a message that communicates the exit of the user from the geofenced area.

Figure 13:
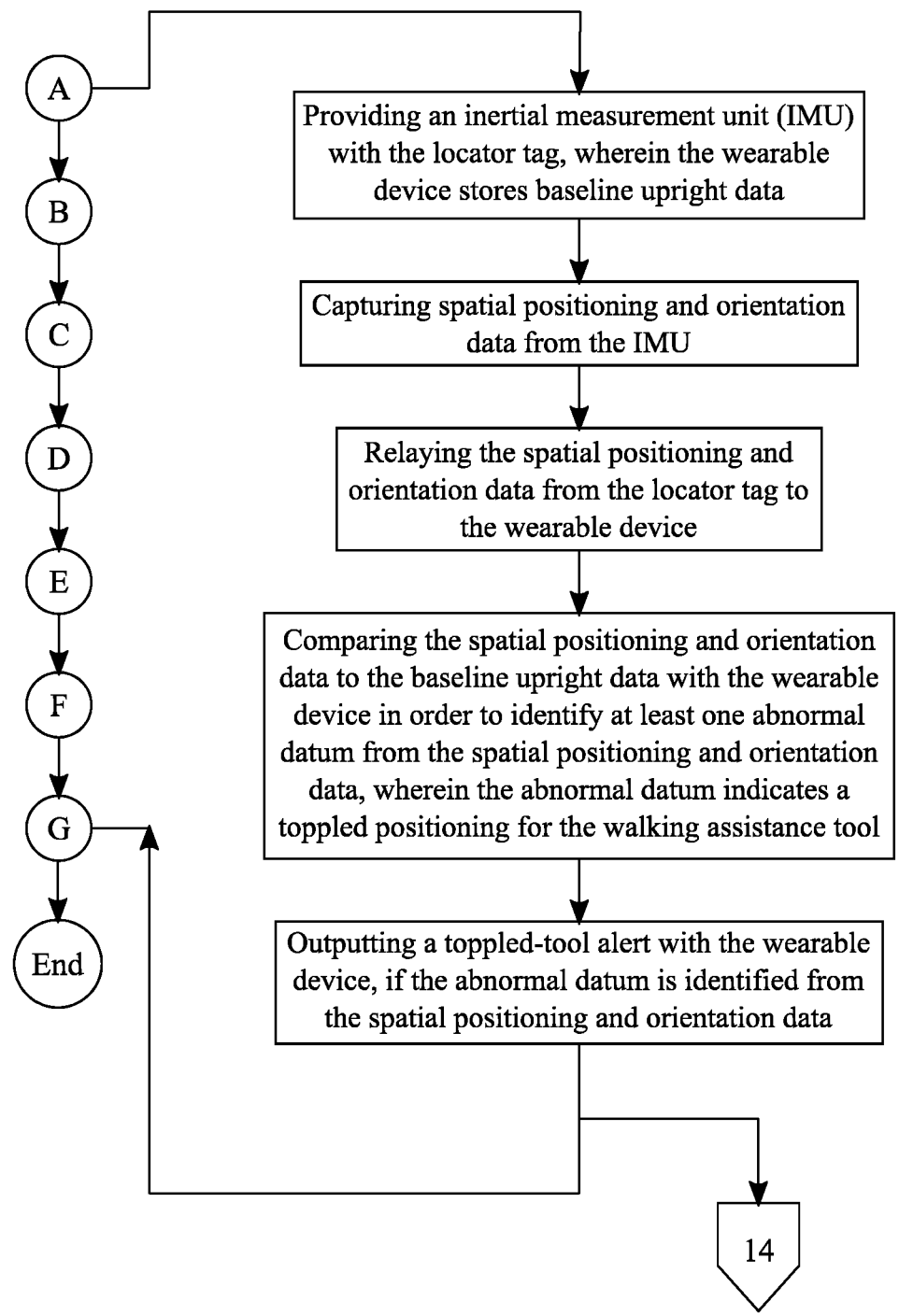
FIG. 13 is a flowchart illustrating the subprocess for outputting a toppled-tool alert with the wearable device.
Figure 14:
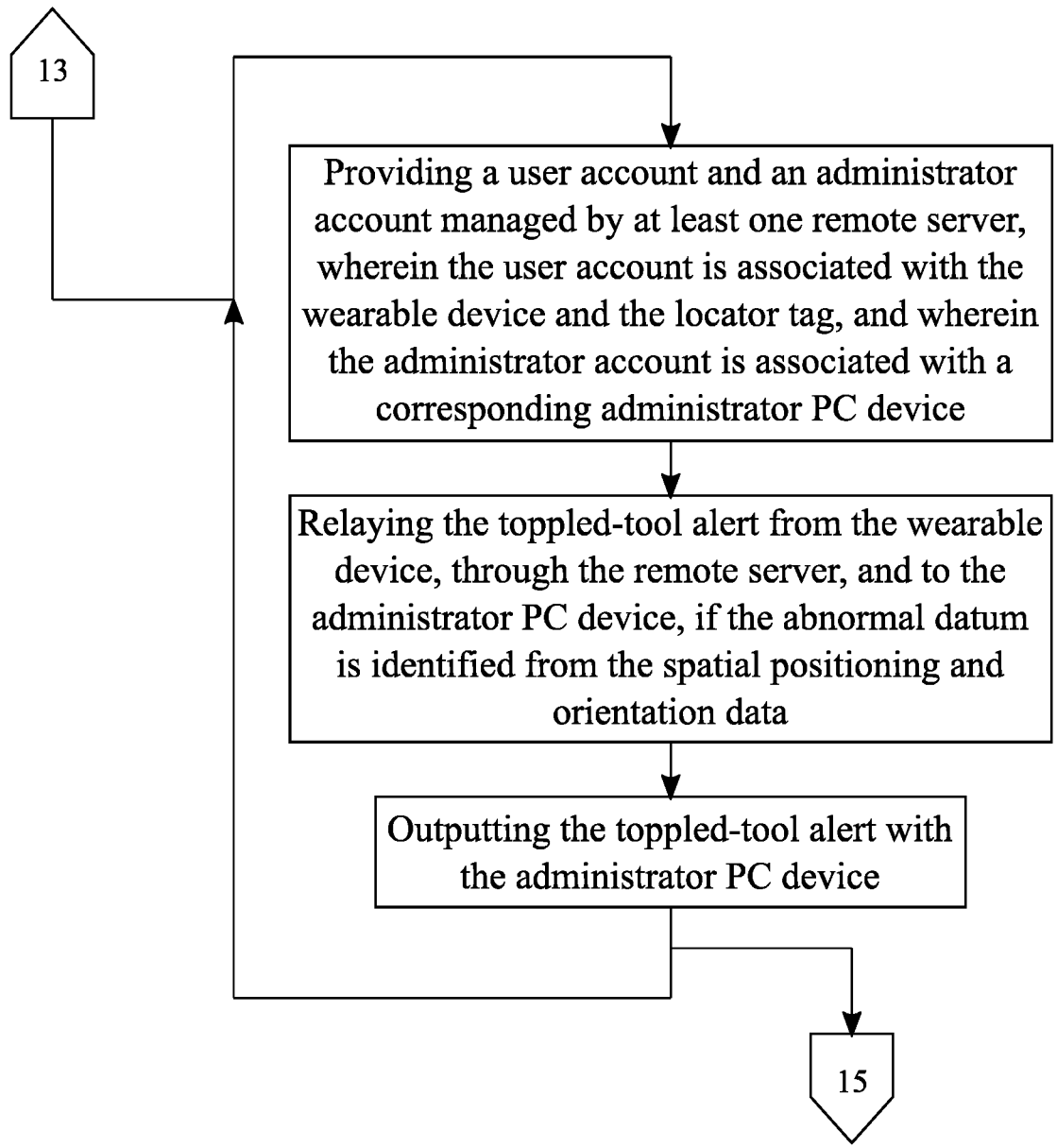
FIG. 14 is a flowchart illustrating the subprocess for outputting the toppled-tool alert with the administrator PC device.
Figure 15:
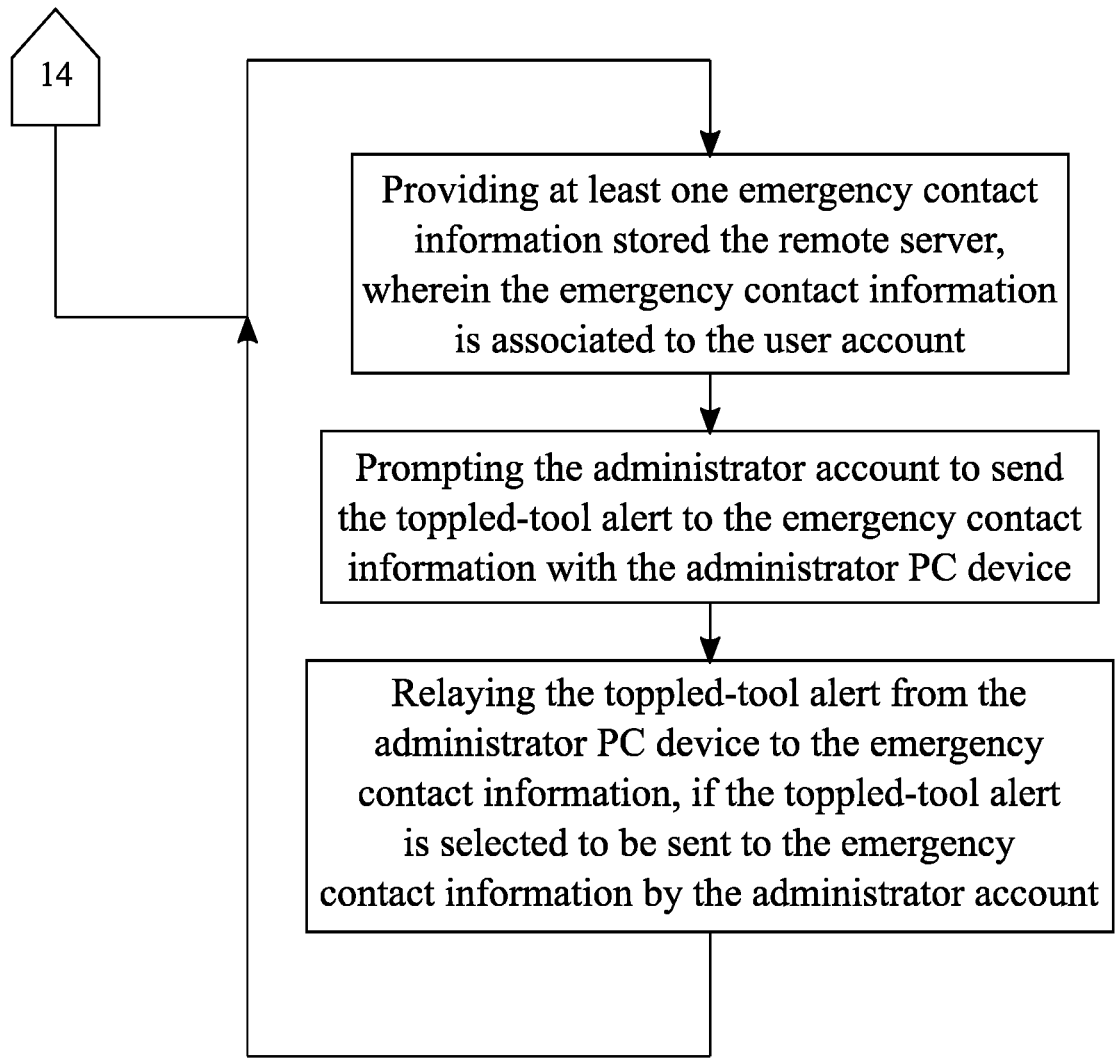
FIG. 15 is a flowchart illustrating the subprocess for relaying the toppled-tool alert from the administer PC device to the emergency contact information.

In the event that the walking assistance tool has fallen over, but the distance difference remains less than the proximal distance threshold, the user is still notified as an inertial measurement unit (IMU) is provided with the locator tag, shown in FIG. 13. The wearable device stores baseline upright data which serves as a standard or comparison for a correct orientation of the walking assistance device. Spatial positioning and orientation data is captured from the IMU in order to detect the real-time orientation of the walking assistance device. The spatial positioning and orientation data is relayed from the locator tag to the wearable device so that the spatial positioning and orientation data can be further processed by the wearable device in order to identify at least one abnormal datum from the spatial positioning and orientation data, wherein the abnormal datum indicates a toppled positioning for the walking assistance tool. Moreover, the wearable device is able to process the spatial positioning and orientation data. A toppled-tool alert is outputted with the wearable device, if the abnormal datum is identified from the spatial positioning and orientation data. The toppled-tool alert notifies the user with the wearable device that the walking assistance tool has fallen over. Furthermore, the toppled-tool alert is relayed from the wearable device, through the remote server, and to the administrator PC device, if the abnormal datum is identified from the spatial positioning and orientation data, as seen in FIG. 14. This allows the administrator to also be made aware of the walking assistance tool has fallen over. The toppled-tool alert is outputted with the administrator PC device, preferably as a message. The message may be accompanied with an audible alert as well. A family member or guardian of the user is notified as well as the administrator account is prompted to send the toppled-tool alert to the emergency contact information with the administrator PC device, seen in FIG. 15. The toppled-tool alert is relayed from the administrator PC device to the emergency contact information, if the toppled-tool alert is selected to be sent to the emergency contact information by the administrator account, thereby notifying the family member or guardian associated with the at least one emergency contact of the incident.

Figure 16:
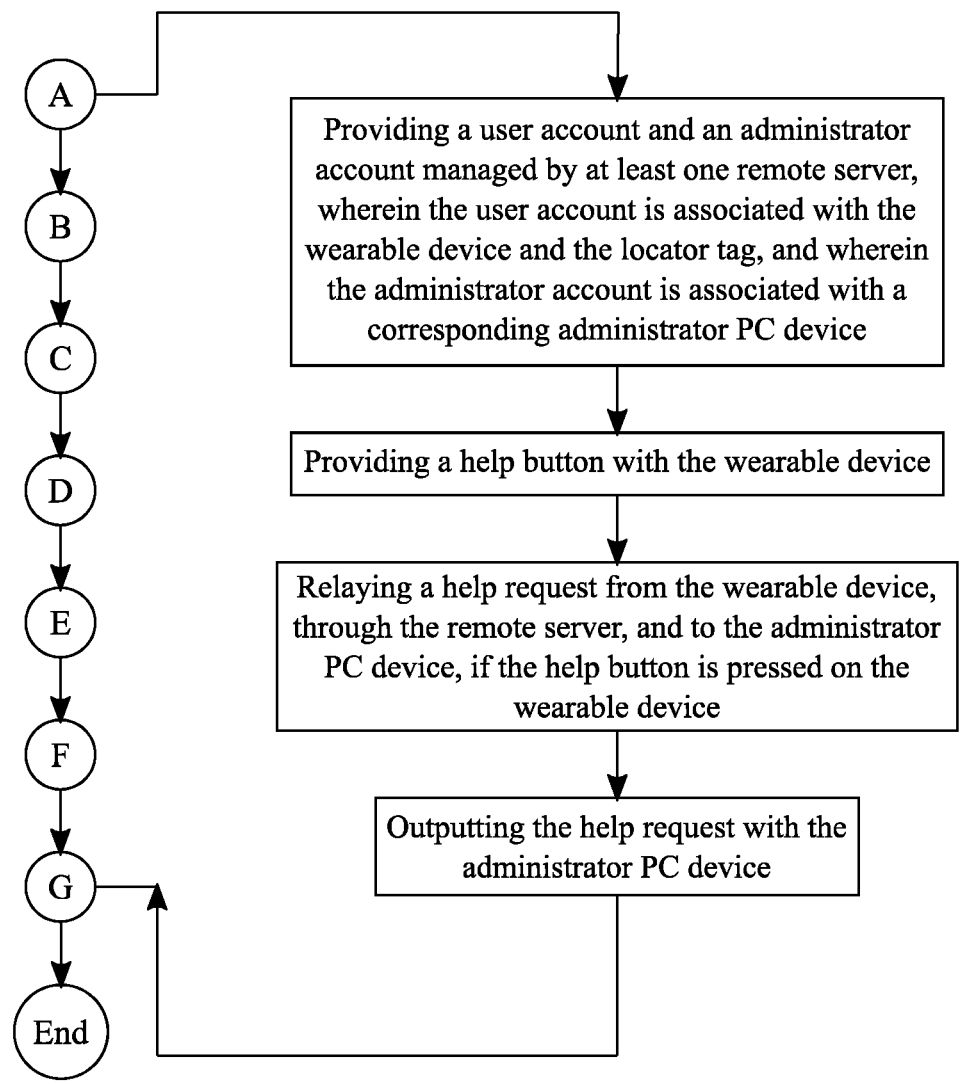
FIG. 16 is a flowchart illustrating the subprocess for outputting a help request with the administrator PC device.

In the event of an emergency or a situation in need of assistance, a help button is provided with the wearable device, shown in FIG. 16. The help button allows a user to enter a manual command into the wearable device, which is meant to communicate the presence of the emergency or the need of assistance to the administrator. A help request is relayed from the wearable device, through the remote server, and to the administrator PC device, if the help button is pressed on the wearable device. The help request communicates the to the administrator the immediate need of a response or action of the administrator or first responder. The help request is outputted with the administrator PC device, notifying the administrator of the emergency or the need of assistance.

Figure 17:
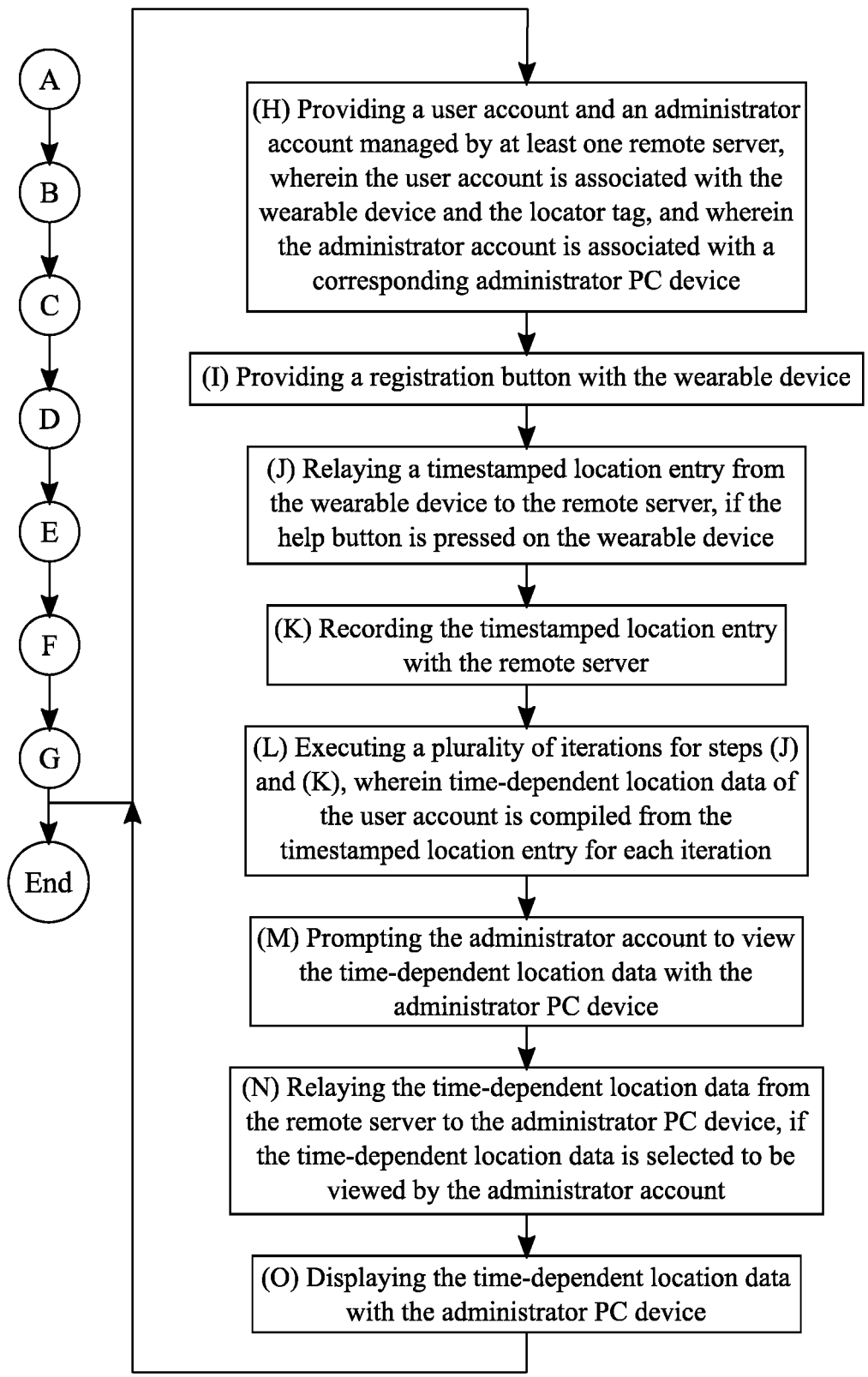
FIG. 17 is a flowchart illustrating the process of generating time-dependent location data for the user account.

In a preferred embodiment of the present invention, a real-time location of the user may be recorded according to the discretion of the user as a user account and an administrator account is managed by at least one remote server (Step H), seen in FIG. 17. The real-time location of the user is a specific and current location of the user with the wearable device. Moreover, the user account is associated with the wearable device and the locator tag, and the administrator account is associated with a corresponding administrator PC device. A registration button is provided with the wearable device (Step I). The user may feel uneasy or experience slight memory loss without being in any immediate danger and may record a specific and current location with the engagement of the registration button. A timestamped location entry is relayed from the wearable device to the remote server, if the help button is pressed on the wearable device (Step J). The timestamped location entry provides the coordinates and time associated with the specific and current location the user wishes to record. The timestamped location entry is then recorded with the remote server (Step K). A plurality of iterations for Step J and Step K is executed, wherein time-dependent location data of the user account is compiled from the timestamped location entry for each iteration (Step L). The plurality of iterations for Step J and Step K are thus able to record multiple instances where the user pressed the registration button. The time-dependent location data indicates the changes in the specific and current location of the user over time. In order for the administrator to determine the final location of the user, the administrator account is prompted to view the time-dependent location data with the administrator PC device (Step M). The time-dependent location data is relayed from the remote server to the administrator PC device, if the time-dependent location data is selected to be viewed by the administrator account (Step N), thereby presenting the time-dependent location data with administrator PC device. The time-dependent location data is finally displayed with the administrator PC device (Step 0), allowing the administrator to view the time-dependent location data with the administrator PC device.

Figure 18:
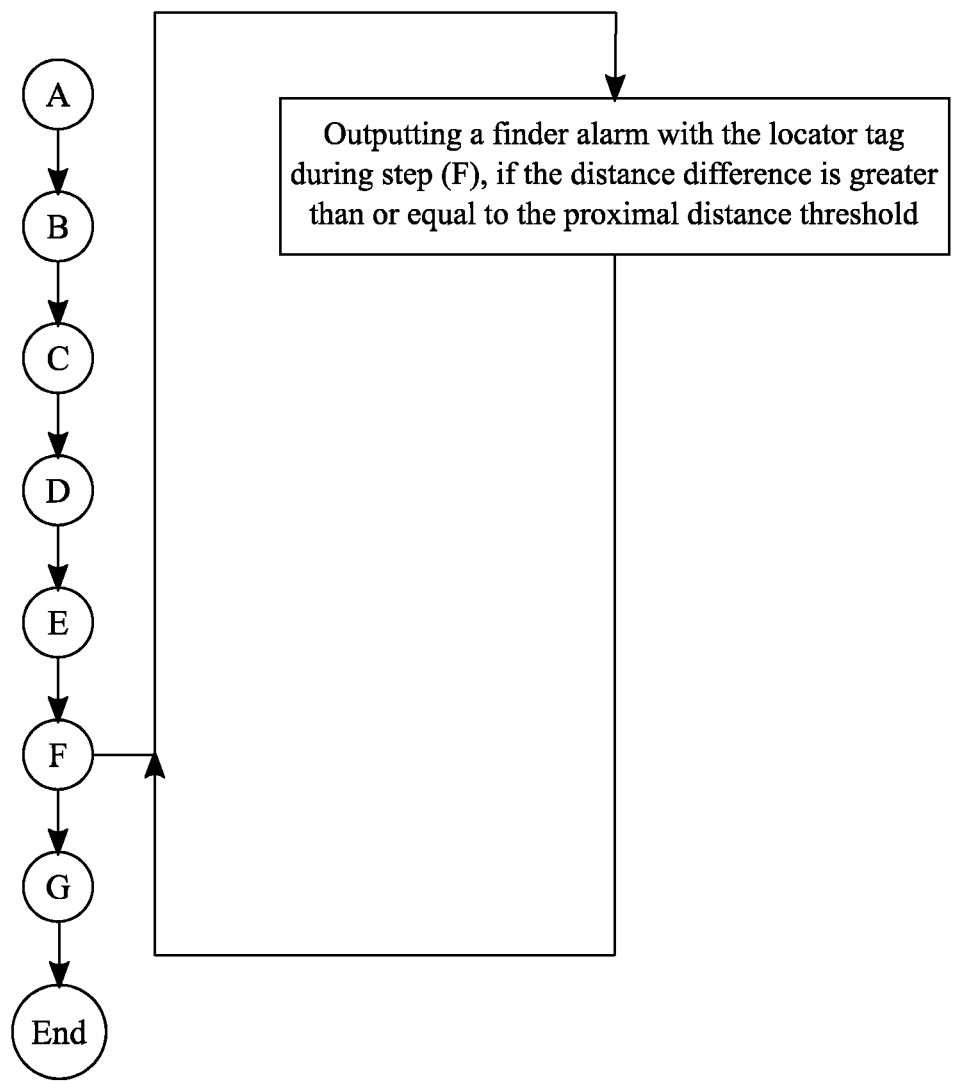
FIG. 18 is a flowchart illustrating the subprocess for outputting a finder alarm with the locator tag.

In further embodiments of the present invention, the user is able to more quickly identify the location of a forgotten or misplaced walking assistance device as a finder alarm is outputted with the locator tag during Step F, if the distance is greater than or equal to the proximal threshold, seen in FIG. 18. The finder alarm is distinguishable from the separation alert so that the user may locate the walking assistance device with the aid of the finder alarm.

Figure 19:
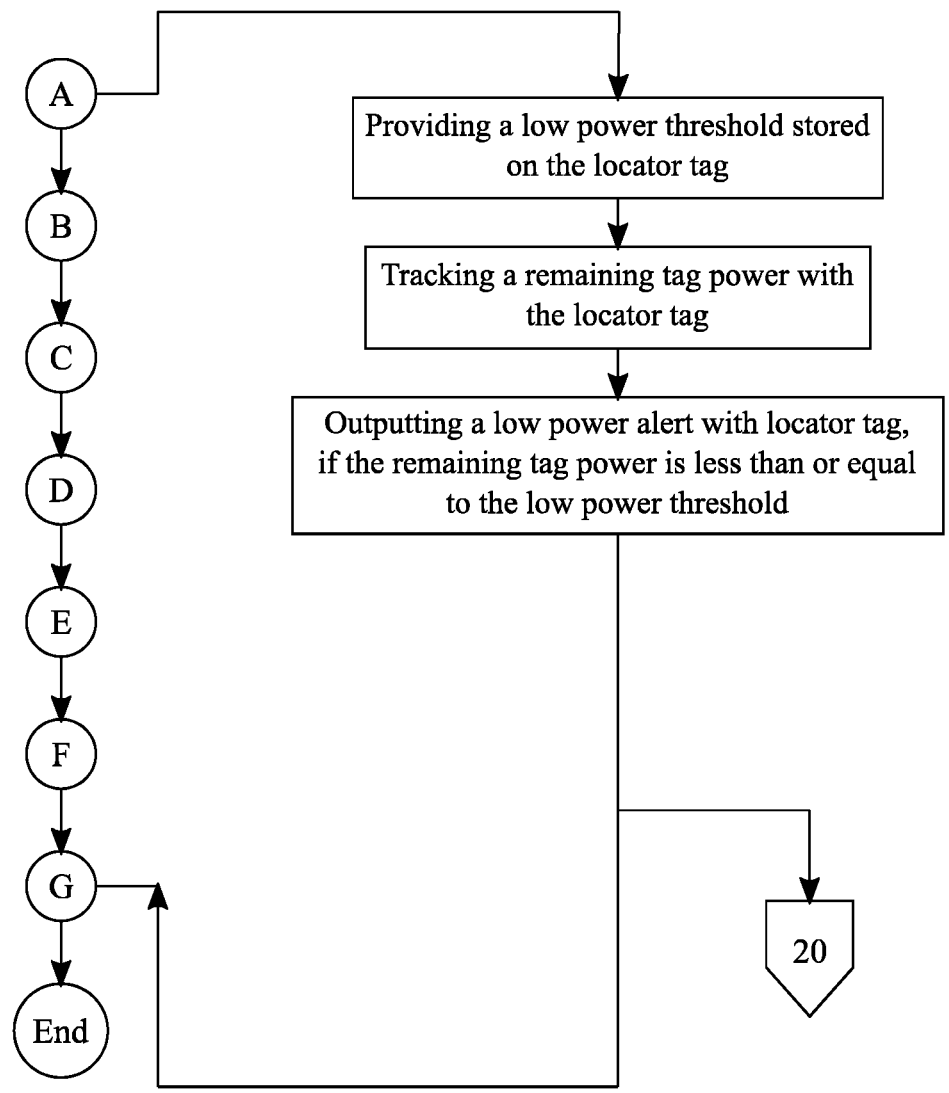
FIG. 19 is a flowchart illustrating the subprocess for outputting a low power alert with the locator tag.
Figure 20:
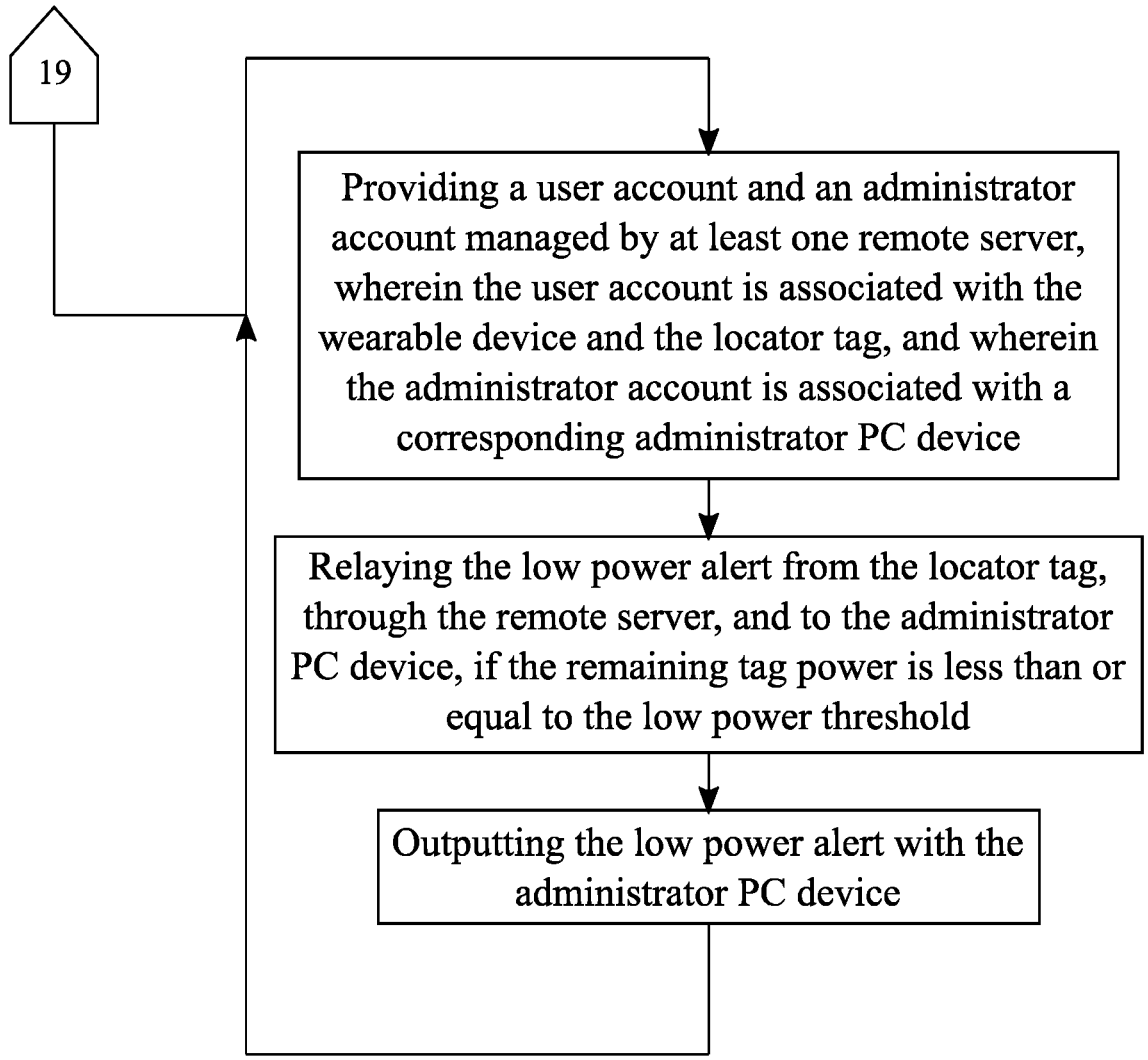
FIG. 20 is a flowchart illustrating the subprocess for outputting the low power alert with the administrator PC device.

In further embodiments of the present invention, the power supply is monitored so that the locator tag is able to communicate with the wearable device. In order to ensure that the locator tag is constantly monitored, a low power threshold is provided and stored on the locator tag, as seen in FIG. 19. The low power threshold is the minimum amount of power available for a power supply of the locator tag to be able to operate for a given amount of time. The power supply can be, but is not limited to, a replaceable battery, a rechargeable battery, or a solar-powered battery. A remaining tag power is tracked with the locator tag. The remaining tag power is the current amount of remaining power that is available to be used by the locator tag. A low power alert is outputted with the locator tag, if the remaining tag power is less than or equal to the low power threshold. The low power alert notifies the user that the locator tag needs a new power supply or needs to be recharged. Furthermore, the low power alert is relayed from the locator tag, through the remote server, and to the administrator PC device, if the remaining tag power is less than or equal to the low power threshold, in order to notify the administrator that the locator tag of the user may lose power soon and may need assistance resupplying the power supply, as seen in FIG. 20. The low power alert is outputted with the administrator PC device so that the administrator is made aware of the low power supply of the locator tag.

Although the invention has been explained in relation to its preferred embodiment, it is to be understood that many other possible modifications and variations can be made without departing from the spirit and scope of the invention as hereinafter claimed.

What is claimed is:

1. A method of wirelessly tracking a walking assistance tool, the method comprises the steps of:
   (A) providing a wearable device and a locator tag, wherein the locator tag is either integrated into or attached onto a walking assistance tool, and wherein the wearable device stores a proximal distance threshold and a geofenced area;
   (B) tracking a current device location with the wearable device;
   (C) tracking a current tag location with the locator tag;
   (D) relaying the current tag location from the locator tag to the wearable device;
   (E) calculating a distance difference between the current device location and the current tag location with the wearable device;
   (F) outputting a separation alert with the wearable device, if the distance difference is greater than or equal to the proximal distance threshold; and,
   (G) outputting a desertion alert with the wearable device, if the current device location is outside of the geofenced area;
   (H) providing a user account and an administrator account managed by at least one remote server, wherein the user account is associated with the wearable device and the locator tag, and wherein the administrator account is associated with a corresponding administrator PC device;
   relaying the current tag location from the locator tag to the administrator PC device after step (C);
   generating a user identifier for the user account with the administrator PC device; and,
   displaying the current tag location with the user identifier on a geographical map with the administrator PC device.

2. The method of wirelessly tracking a walking assistance tool, the method as claimed in claim 1 comprises the steps of:
   relaying the separation alert from the wearable device, through the remote server, and to the administrator PC device after step (F), if the distance difference is greater than or equal to the proximal distance threshold; and,
   outputting the separation alert with the administrator PC device.

3. The method of wirelessly tracking a walking assistance tool, the method as claimed in claim 2 comprises the steps of:
   providing at least one emergency contact information stored with the remote server, wherein the emergency contact information is contact information for at least one emergency contact associated to the user account;
   prompting the administrator account to send the separation alert to the emergency contact information with the administrator PC device; and,
   relaying the separation alert from the administrator PC device to the emergency contact information, if the separation alert is selected to be sent to the emergency contact information by the administrator account.

4. The method of wirelessly tracking a walking assistance tool, the method as claimed in claim 1 comprises the steps of:
   relaying the desertion alert from the wearable device, through the remote server, and to the administrator PC device after step (G), if the current device location is outside of the geofenced area; and,
   outputting the desertion alert with the administrator PC device.

5. The method of wirelessly tracking a walking assistance tool, the method as claimed in claim 4 comprises the steps of:
   providing at least one emergency contact information stored the remote server, wherein the emergency contact information is contact information for at least one emergency contact associated to the user account;
   prompting the administrator account to send the desertion alert to the emergency contact information with the administrator PC device; and,
   relaying the desertion alert from the administrator PC device to the emergency contact information, if the desertion alert is selected to be sent to the emergency contact information by the administrator account.

6. The method of wirelessly tracking a walking assistance tool, the method as claimed in claim 1 comprises the steps of:
   relaying the current device location from the wearable device to the administrator PC device after step (B);
   generating a user identifier for the user account with the administrator PC device; and,
   displaying the current device location with the user identifier on a geographical map with the administrator PC device.

7. The method of wirelessly tracking a walking assistance tool, the method as claimed in claim 1 comprises the steps of:
   providing a vibration module with the wearable device; and, actuating the vibration module as the separation alert during step (F).

8. The method of wirelessly tracking a walking assistance tool, the method as claimed in claim 1 comprises the steps of:
providing a vibration module with the wearable device; and,
actuating the vibration module as the desertion alert during step (G).

9. The method of wirelessly tracking a walking assistance tool, the method as claimed in claim 1 comprises the steps of:
providing at least one computerized audio device;
relaying the separation alert from the wearable device to the computerized audio device after step (F), if the distance difference is greater than or equal to the proximal distance threshold; and,
audibly outputting the separation alert with the computerized audio device.

10. The method of wirelessly tracking a walking assistance tool, the method as claimed in claim 1 comprises the steps of:
providing at least one computerized audio device;
relaying the desertion alert from the wearable device to the computerized audio device after step (G), if the current device location is outside of the geofenced area; and,
audibly outputting the desertion alert with the computerized audio device.

11. The method of wirelessly tracking a walking assistance tool, the method as claimed in claim 1 comprises the steps of:
providing an inertial measurement unit (IMU) with the locator tag, wherein the wearable device stores baseline upright data;
capturing spatial positioning and orientation data from the IMU;
relaying the spatial positioning and orientation data from the locator tag to the wearable device;
comparing the spatial positioning and orientation data to the baseline upright data with the wearable device in order to identify at least one abnormal datum from the spatial positioning and orientation data, wherein the abnormal datum indicates a toppled positioning for the walking assistance tool; and,
outputting a toppled-tool alert with the wearable device, if the abnormal datum is identified from the spatial positioning and orientation data.

12. The method of wirelessly tracking a walking assistance tool, the method as claimed in claim 11 comprises the steps of:
relaying the toppled-tool alert from the wearable device, through the remote server, and to the administrator PC device, if the abnormal datum is identified from the spatial positioning and orientation data; and,
outputting the toppled-tool alert with the administrator PC device.

13. The method of wirelessly tracking a walking assistance tool, the method as claimed in claim 12 comprises the steps of:
providing at least one emergency contact information stored the remote server, wherein the emergency contact information is contact information for at least one emergency contact associated to the user account;
prompting the administrator account to send the toppled-tool alert to the emergency contact information with the administrator PC device; and,
relaying the toppled-tool alert from the administrator PC device to the emergency contact information, if the toppled-tool alert is selected to be sent to the emergency contact information by the administrator account.

14. The method of wirelessly tracking a walking assistance tool, the method as claimed in claim 1 comprises the steps of:
providing a help button with the wearable device;
relaying a help request from the wearable device, through the remote server, and to the administrator PC device, if the help button is pressed on the wearable device; and,
outputting the help request with the administrator PC device.

15. The method of wirelessly tracking a walking assistance tool, the method as claimed in claim 1 comprises the steps of:
(I) providing a registration button with the wearable device;
(J) relaying a timestamped location entry from the wearable device to the remote server, if the help button is pressed on the wearable device;
(K) recording the timestamped location entry with the remote server;
(L) executing a plurality of iterations for steps (J) and (K), wherein time-dependent location data of the user account is compiled from the timestamped location entry for each iteration;
(M) prompting the administrator account to view the time-dependent location data with the administrator PC device;
(N) relaying the time-dependent location data from the remote server to the administrator PC device, if the time-dependent location data is selected to be viewed by the administrator account; and,
(O) displaying the time-dependent location data with the administrator PC device.

16. The method of wirelessly tracking a walking assistance tool, the method as claimed in claim 1 comprises the step of:
outputting a finder alarm with the locator tag during step (F), if the distance difference is greater than or equal to the proximal distance threshold.

17. The method of wirelessly tracking a walking assistance tool, the method as claimed in claim 1 comprises the step of:
providing a low power threshold stored on the locator tag;
tracking a remaining tag power with the locator tag; and,
outputting a low power alert with locator tag, if the remaining tag power is less than or equal to the low power threshold.

18. The method of wirelessly tracking a walking assistance tool, the method as claimed in claim 17 comprises the steps of:
relaying the low power alert from the locator tag, through the remote server, and to the administrator PC device, if the remaining tag power is less than or equal to the low power threshold; and,
outputting the low power alert with the administrator PC device.

* * * * *